United States Patent
Fischmann (10) Patent No.: US 12,448,799 B2
(45) Date of Patent: *Oct. 21, 2025

(54) VENUE TRANSFORMATION AND CONSTRUCTION METHOD FOR CREATING A PUBLIC ACCESS TROPICAL STYLE SWIMMING LAGOON WITH BEACHES AT THE INFIELD OF RACING AND/OR ACTIVITY CIRCUITS

(71) Applicant: CRYSTAL LAGOONS TECHNOLOGIES, INC., Miami, FL (US)

(72) Inventor: Fernando Benjamin Fischmann, Miami, FL (US)

(73) Assignee: CRYSTAL LAGOONS TECHNOLOGIES, INC., Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/658,648

(22) Filed: May 8, 2024

(65) Prior Publication Data

US 2024/0287824 A1 Aug. 29, 2024

Related U.S. Application Data

(63) Continuation of application No. 17/670,948, filed on Feb. 14, 2022, now Pat. No. 12,031,348, which is a
(Continued)

(51) Int. Cl.
*E04H 4/00* (2006.01)
*A63G 31/00* (2006.01)
(Continued)

(52) U.S. Cl.
CPC .............. *E04H 4/00* (2013.01); *A63G 31/007* (2013.01); *A63K 1/00* (2013.01); *E02D 1/022* (2013.01);
(Continued)

(58) Field of Classification Search
CPC .... E04H 4/00; E04H 3/02; E04H 3/22; E04H 4/148; E04H 3/12; A63K 1/00;
(Continued)

(56) References Cited

U.S. PATENT DOCUMENTS 483,600 A * 10/1892 Butler ...................... A63K 1/00
119/422
3,490,081 A * 1/1970 Ogden .................. E04H 4/1209
4/510
(Continued)

OTHER PUBLICATIONS

Maps, Daytona International Speedway, <https://www.daytonainternationalspeedway.com/Plan-Your-Visit/Maps.aspx> (Year: 2020).*
(Continued)

*Primary Examiner* — Brent W Herring
(74) *Attorney, Agent, or Firm* — MERCHANT & GOULD P.C.

(57) ABSTRACT

A venue transformation and construction method is disclosed that creates a tropical style swimming lagoon at an infield site of a race or activity circuit facility, the infield site being contained within a race or activity circuit perimeter. The transformation includes demolishing at least part of the infield site; excavating material from an area within the infield site; and forming a basin for a large water body having a surface area of at least 3,000 m2. Water containment walls are constructed on a first section and a sloped access area is formed on a second section of the basin for a beach. A barrier is included to control access to the beach. At least one additional recreational facility is constructed around the basin and a connection is provided that connects the outfield of the race or activity circuit with the infield site to allow transit of vehicles and/or people.

18 Claims, 5 Drawing Sheets

Related U.S. Application Data continuation of application No. 16/725,987, filed on Dec. 23, 2019, now Pat. No. 11,280,099, which is a continuation-in-part of application No. 16/538,273, filed on Aug. 12, 2019, now Pat. No. 10,724,260.

(60) Provisional application No. 62/785,086, filed on Dec. 26, 2018.

(51) Int. Cl.
| | | |
|---|---|---|
| *A63K 1/00* | (2006.01) | |
| *E02D 1/02* | (2006.01) | |
| *E02D 17/00* | (2006.01) | |
| *E04H 3/02* | (2006.01) | |
| *E04H 3/22* | (2006.01) | |
| *E04H 4/14* | (2006.01) | |
| *G06Q 50/16* | (2012.01) | |
| *G06Q 20/04* | (2012.01) | |

(52) U.S. Cl.
CPC .............. *E02D 17/00* (2013.01); *E04H 3/02* (2013.01); *E04H 3/22* (2013.01); *E04H 4/148* (2013.01); *G06Q 50/165* (2013.01); *G06Q 20/045* (2013.01)

(58) Field of Classification Search
CPC ...... E02D 1/022; E02D 17/00; G06Q 20/045; G06Q 50/165; G06Q 50/08; A63G 31/007
USPC ............ 472/85, 88, 89, 92; 52/169.1, 169.7, 52/169.8, 741.11, 742.1, 742.14
See application file for complete search history.

(56) References Cited

U.S. PATENT DOCUMENTS

| | | | | | |
|---|---|---|---|---|---|
| 3,823,690 | A | * | 7/1974 | Rynberk | E04H 4/00 119/228 |
| 3,829,911 | A | * | 8/1974 | Bishop | E04H 4/1227 4/494 |
| 4,263,759 | A | * | 4/1981 | Miller | E04H 4/00 52/169.7 |
| 4,843,658 | A | * | 7/1989 | Hodak | E04H 4/0081 52/169.9 |
| 4,976,088 | A | * | 12/1990 | Powers | E04H 4/0081 52/169.8 |
| 5,139,853 | A | * | 8/1992 | Mathieson | E02D 31/00 428/131 |
| 5,800,272 | A | * | 9/1998 | Pons | A63G 25/00 472/88 |
| 6,176,049 | B1 | * | 1/2001 | Crant | E04F 11/022 52/189 |
| 6,764,139 | B1 | * | 7/2004 | Wortman | E02F 9/2875 299/95 |
| 7,036,449 | B2 | * | 5/2006 | Sutter | B63B 35/44 114/264 |
| 10,428,542 | B1 | * | 10/2019 | Jackson | E04H 4/0081 |
| 2001/0018370 | A1 | * | 8/2001 | Arie | A63K 1/00 104/53 |
| 2007/0196173 | A1 | * | 8/2007 | Shehan | E02B 17/025 405/13 |
| 2007/0248414 | A1 | * | 10/2007 | Fratianni | E04H 4/00 405/53 |
| 2012/0102874 | A1 | * | 5/2012 | Milani | E02B 3/16 52/741.12 |
| 2014/0228138 | A1 | * | 8/2014 | Scott | A63C 19/00 472/92 |
| 2015/0125212 | A1 | * | 5/2015 | Fischmann | E02B 15/06 405/63 |
| 2016/0177586 | A1 | * | 6/2016 | Nasibov | F24F 5/0071 52/169.2 |
| 2019/0169867 | A1 | * | 6/2019 | Khamis | E04H 4/0018 |
| 2019/0169870 | A1 | * | 6/2019 | Khamis | E04H 4/0018 |
| 2019/0236744 | A1 | * | 8/2019 | Fischmann | C02F 1/004 |
| 2020/0023281 | A1 | * | 1/2020 | Fischmann | E02F 3/8858 |
| 2020/0032502 | A1 | * | 1/2020 | Fischmann | E04H 3/14 |
| 2020/0032503 | A1 | * | 1/2020 | Fischmann | E04H 17/00 |
| 2020/0051057 | A1 | * | 2/2020 | Fischmann | G07F 17/0042 |
| 2020/0074577 | A1 | * | 3/2020 | Fischmann | A63G 31/007 |

OTHER PUBLICATIONS

Martinelli, Michelle, Why NASCAR's Daytona track has its own massive lake, <https://ftw.usatoday.com/story/sports/motorsports/2019/02/16/nascar-daytona-500-lake-lloyd-truex-bowyer/81652439007/> (Year: 2019).*

Busbee, Jay, The wild, weird stories of Lake Lloyd at Daytona International Speedway, <https://sports.yahoo.com/blogs/nascar-from-the-marbles/the-wild--weird-stories-of-lake-lloyd-at-daytona-international-speedway-220533641.html?guccounter=1> (Year: 2015).*

* cited by examiner

VENUE TRANSFORMATION AND CONSTRUCTION METHOD FOR CREATING A PUBLIC ACCESS TROPICAL STYLE SWIMMING LAGOON WITH BEACHES AT THE INFIELD OF RACING AND/OR ACTIVITY CIRCUITS

This application is a Continuation of U.S. patent application Ser. No. 17/670,948, filed Feb. 14, 2022, which is a continuation of U.S. patent application Ser. No. 16/725,987, filed Dec. 23, 2019, now U.S. Pat. No. 11,280,099, which is a Continuation-in-Part of U.S. patent application Ser. No. 16/538,273, filed Aug. 12, 2019, now U.S. Pat. No. 10,724,260, which claims benefit of U.S. Provisional Patent Application No. 62/785,086, filed Dec. 26, 2018 and which applications are incorporated herein by reference. To the extent appropriate, a claim of priority is made to each of the above disclosed applications.

FIELD OF THE INVENTION

The present invention relates generally to a venue transformation and construction method for creating a public access tropical style swimming lagoon at the centerfield of racing and/or activity circuits, for swimming and the practice of water sports, wherein a portion of the infield of such racing and/or activity circuits is demolished in order to generate a swimming lagoon. There is at least an area of the tropical style swimming lagoon where public access is controlled, and a beach area is preferably located within the controlled access area.

BACKGROUND OF THE INVENTION

Although once a booming market, over the years the growth of race and/or activity circuits such as horse race tracks, speedways, athletic courses, among other installations has stopped and is sometimes even declining or has limited uses, one reason being the lack of innovation and additional amenities and features present at these facilities.

In the case of horse race tracks, it has been estimated that its market size for 2019 is USD$3.8 billion (IbisWorld, 2004), with a steady decline tendency of −0.6% per year on average over the last five years. The U.S. alone has more than 75 horse race tracks (WorldCasinoIndex, 2019), and more than 250 worldwide, representing an interesting market to develop and promote new uses and innovations.

In the case of motor race tracks, there are many types such as dirt tracks, paved ovals, and speedways. Dirt track racing is one of the most common types of auto racing in the U.S., and according to the National Speedway Directory there are more than 700 dirt oval tracks in the U.S. (SpeedwayDirectory, 2019). On the other hand, paved tracks are also used for racing, commonly referred to as speedways, and have different shapes but always having a center location where the racing circuit has an oval like shape.

Generally, these types of facilities are only used during planned events and races during the day, not usually being able to use them every day or at nighttime, which means that there is a lot of "dead" times where the facilities are not utilized and therefore they have a very high opportunity cost.

For horse race tracks, for example, generally the races are held once or twice a week, mostly over the weekend, and some facilities have races during a few months of the year and not throughout the year due. For motor race tracks and speedways, it is very similar with motor races being held a few times per week at most. Athletic circuits are even less intensively used, with athletic races or competitions being generally held a few times per month.

However, it's important to mention that even when these facilities are holding an event, there are areas such as the infield area that are not usually utilized for other purposes. Spectators and visitors generally concentrate on the outside borders of the race track and the infield and center of the track does not hold other major activities.

On the other hand, all of these types of facilities have been designed, built, and permitted in order to house a large number of people and visitors, having the proper amount of parking spaces, road connections, restroom facilities, and other installations that allow holding massive events and gatherings. In addition, most of these facilities are located in or close to urban locations, or that are easily accessed by large numbers of people. It is important to highlight that the look of these types of facilities is very similar and generally tends to move toward rough concrete and artificial looking structures, not being aesthetically pleasant for visitors.

Therefore, one wonders why all of these locations that are already designed and built to house massive amounts of people are so underutilized, being used a few times per week or per season but already having all the infrastructure needed to operate every day if necessary. There is a poor utilization of urban spaces, with facilities that are able to congregate large amounts of people and that have prime locations easily accessed by visitors not being used more often.

Figure 1:
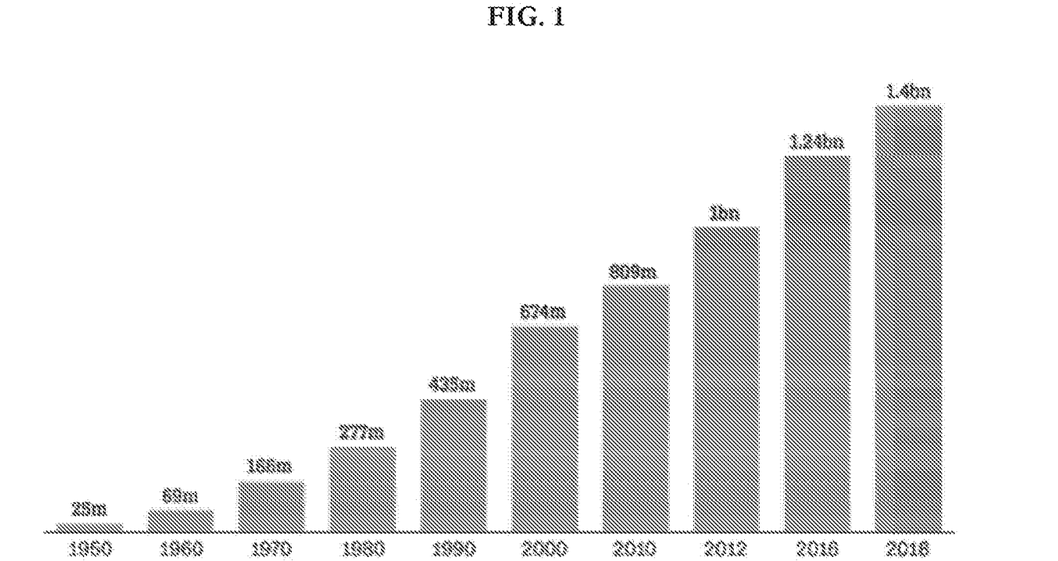
FIG. 1 shows the number of international tourist arrivals given by the World Tourism Organization in 2017, referring to the number of inbound journeys by international tourists to a country outside the destination they live in for a duration of less than a year.
Figure 2:
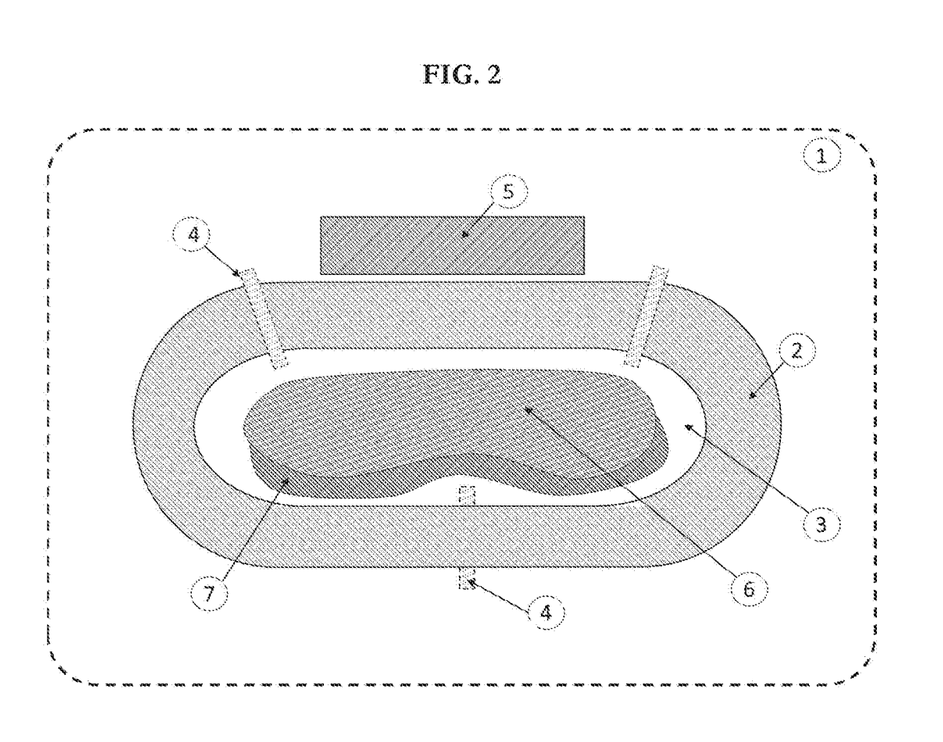
FIG. 2 illustrates a top view of a schematic of the race track facility (1) after the method from the present invention has been implemented, wherein a swimming lagoon (6) with at least one beach area (7) has been constructed at the infield site (3) of a race track facility (1), including also a connection path (4) and a spectator area (5).

In addition to this poor use of well-connected urban spaces with infrastructure to hold large events and gatherings, there has been an explosive increase in worldwide tourism over the years that has substantially increased its carbon footprint (See FIG. 1 that shows the increase of tourists over the years). This is mainly because people have to travel long distances and use their car, or have to fly, or use other transport means to be able to reach waterfront settings and beach areas, sometimes having to travel hundreds of miles to be a part of a beautiful waterfront beach setting, in result having a very large carbon footprint due to all of this movement. This is especially relevant today, where society has become very aware of carbon footprint, where travel is one of the big contributors of carbon emissions.

Finally, it's important to note that urban locations are very hectic and stressful and urban population has increasing demands for open recreational spaces where they can relax, practice sports, and enjoy of beautiful scenery and spaces. Congregation spaces are scarce, and the old tradition of congregating in shopping malls or retail facilities has shifted into a search for open and natural settings.

Therefore, as it has been mentioned before, there are many of these types of racetrack facilities that have already built infrastructure to hold large numbers of people, but that have limited uses or are only used during programmed events, that have poor aesthetics, and that only offer their visitors with very limited activities and amenities.

SUMMARY

Therefore, according to one aspect of the invention, there is provided a venue transformation and construction method for creating a tropical style swimming lagoon with a sloped access at an infield site of a race or activity circuit facility, the infield site being contained within a race or activity circuit perimeter, the method comprising: demolishing at least part of the infield site, wherein the demolition process includes excavating at least a 15 cm to 6 meter layer; excavating material having a volume of at least 4,000 m3 from an area within the infield site; forming a basin for a large water body having a surface area of at least 3,000 m2 and a minimum depth of at least 1.4 meters at its deepest point, wherein earthworks for the basin are created within the infield surrounding perimeter, and wherein the basin includes a basin perimeter and a bottom; constructing water containment walls on at least one section of the basin perimeter to form a waterfront perimeter, and covering the bottom of the basin with a non-permeable material not including thick concrete like conventional swimming pools, wherein the shape of the waterfront perimeter is curved and the basin has a maximum width of 300 meters; constructing a sloped access area on at least one section of the basin perimeter to form a beach access into the large water body; constructing one or more barriers around the basin perimeter to cordon off an area to establish a controlled access area, wherein the controlled access area includes a beach access perimeter, and the barriers include at least one access point to selectively allow users into the controlled access area, whereby the users allowed entry into the controlled access area are able to use the beach access; constructing at least one additional recreational facility comprising food and beverage and commercial facilities such as restaurants, bars, kiosks, stores, cafes among others in the vicinity of the waterfront perimeter; and providing a connection that connects the outfield of the racing and/or activity circuit with the infield site, in order to allow transit of vehicles and/or people from the outfield to the infield.

These and other variations of the invention will become apparent to those skilled in the art upon a more detailed description of the invention. The advantages and features which characterize the invention are pointed out with particularity in the claims annexed hereto and forming a part hereof. For a better understanding of the invention, however, reference should be had to the drawings which form a part hereof and to the accompanying descriptive matter, in which there is illustrated and described a preferred embodiment of the invention.

DESCRIPTION OF FIGURES

Referring to the drawings, wherein like numerals represent like parts throughout the several views:

FIG. 4 shows a preferred construction method 8 in accordance with the principles of the present invention. The first step 8a is to demolish at least part of the infield site. The next step 8b is to excavate materials having a volume of at least 4,000 m3. Then at step 8c a basin is formed for large water body having a surface area of at least 3,000 m2, this may include in part earthworks from the excavated material and/or from additional materials brought to the site. At step 8d, water containment walls are constructed on at least one section of the basin. At step 8e, a sloped access area in at least one section of the basin is optionally created in the event a swimming area is included. At 8f, barriers are constructed around the basin perimeter to establish a controlled access area for a beach or other area in which user controlled access is desired. At step 8g, at least one additional recreational facility is constructed, and finally at step 8h a connection is provided between the outfield and the infield site to allow transit of vehicles and/or people from both sides.

FIG. 5 illustrates an embodiment in which the depth of the lagoon 6 near the wall is relatively shallow. Next FIG. 6 shows a side view of another embodiment of the containment walls 10 for the basin of the swimming lagoon 6, showing backfill material 11 to provide structural stability to the containment wall, and wherein a non-permeable material 13 contains the water within the large water body, and is located on top of the bottom soil 12.

FIG. 6 illustrates an embodiment in which the depth of the lagoon 6 near the wall is relatively deep.

DETAILED DESCRIPTION OF THE INVENTION

Figure 3:
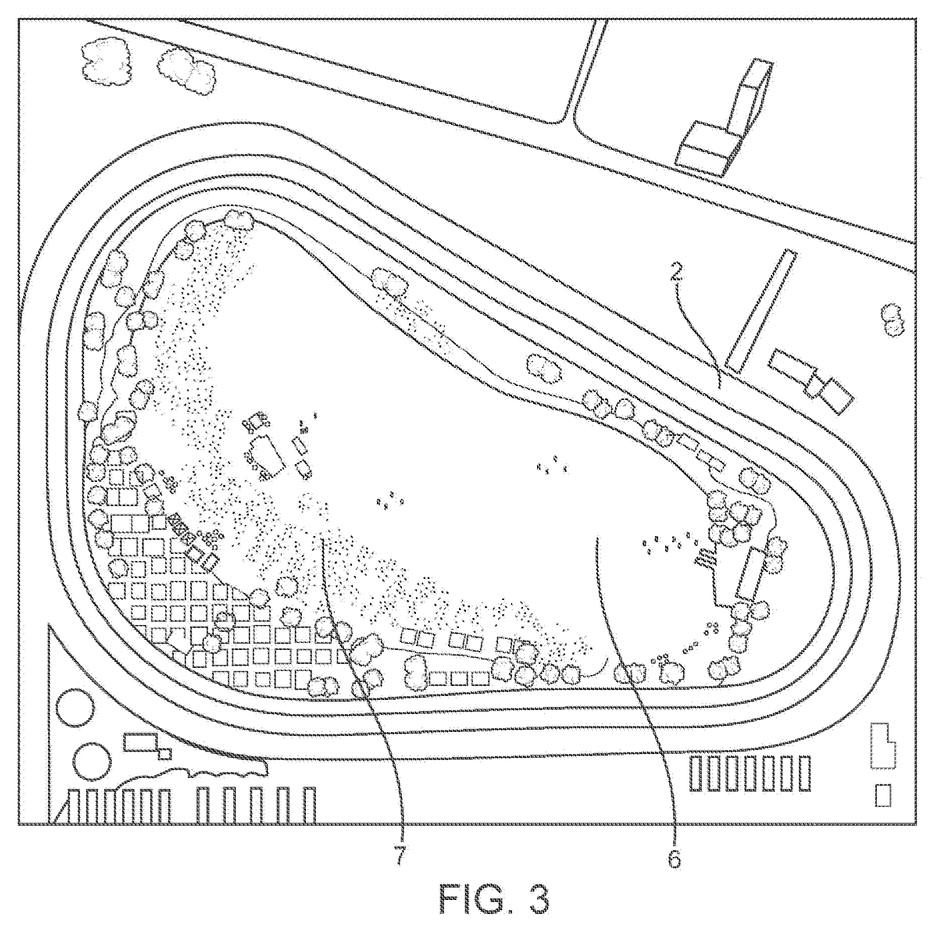
FIG. 3 shows illustrates a prophetic example of a horse race track (1) after the method from the present invention has been implemented, wherein a swimming lagoon (3) is located in the infield site (3), wherein the swimming lagoon as an extended beach area (7) surrounded by the track circuit (2).
Figure 4:
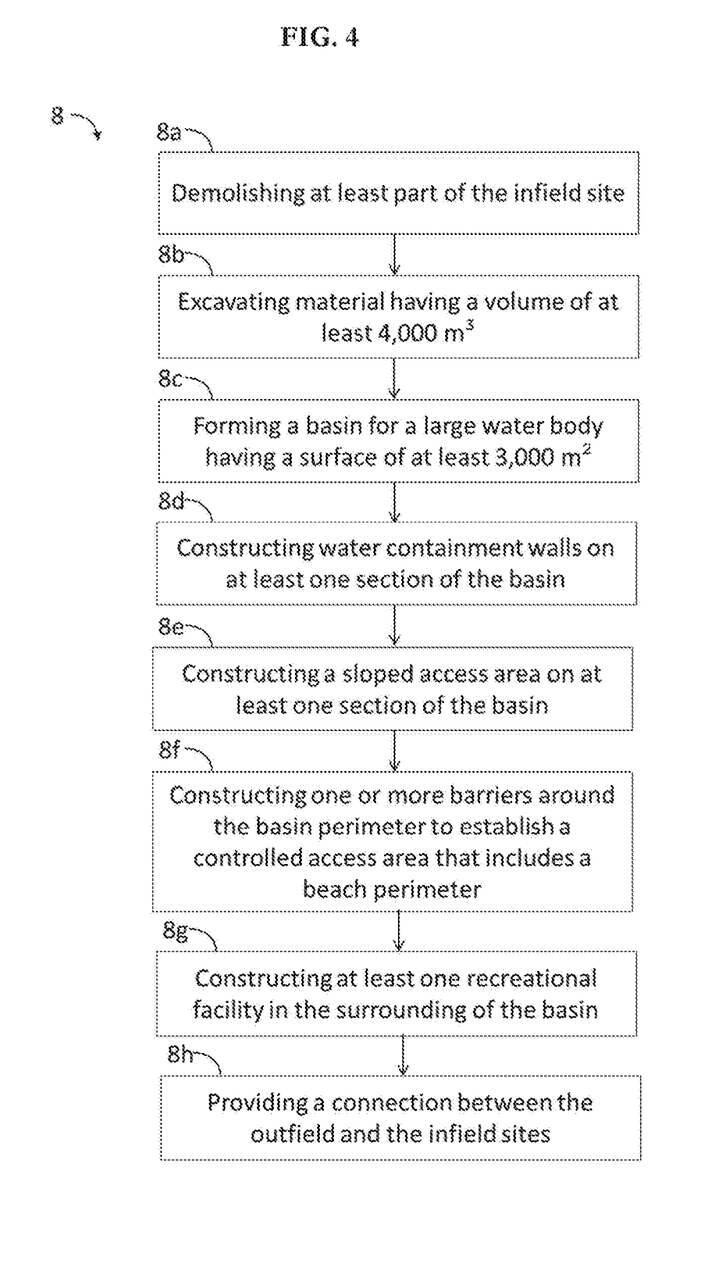
Figure 5:
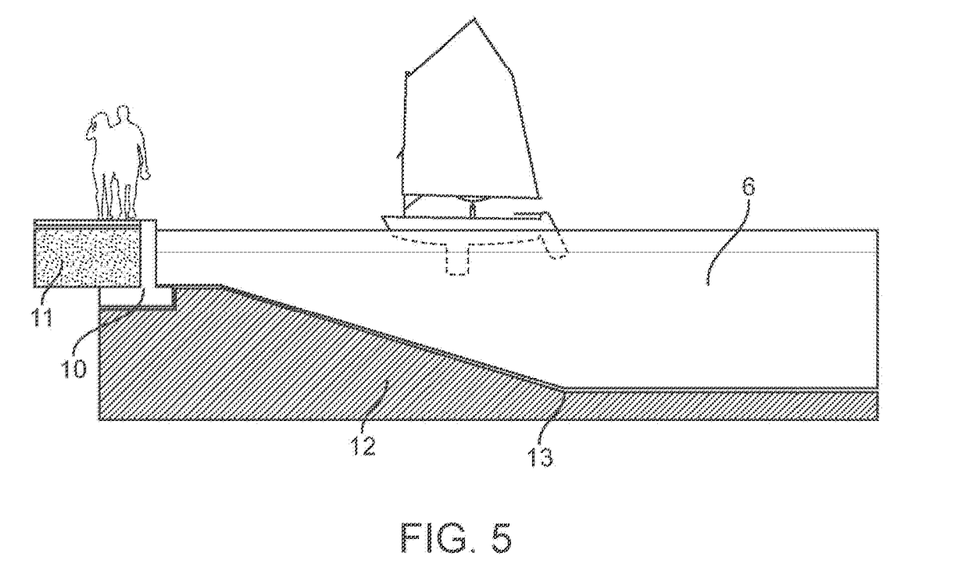
FIGS. 5 and 6 show side views of embodiments of the containment walls 10 for the basin of the swimming lagoon 6. First referring to FIG. 5, backfill material 11 is included to provide structural stability to the containment wall 10. A non-permeable material 13 contains the water in the large water body (e.g., the swimming lagoon 6), and is located on top of the bottom soil 12.
Figure 6:
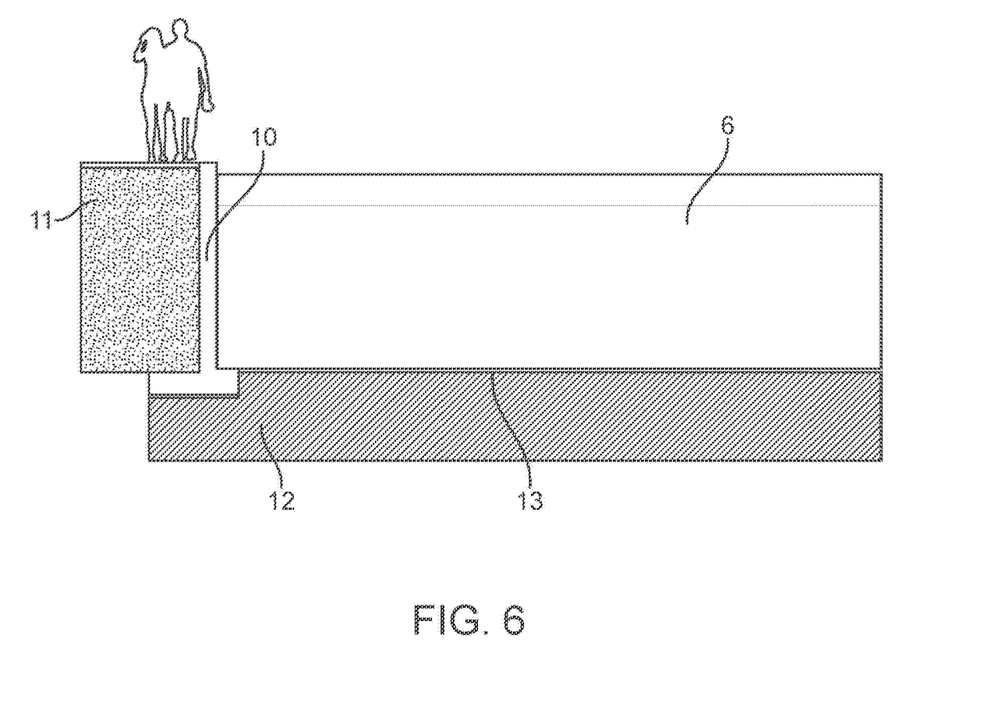
Figure 7:
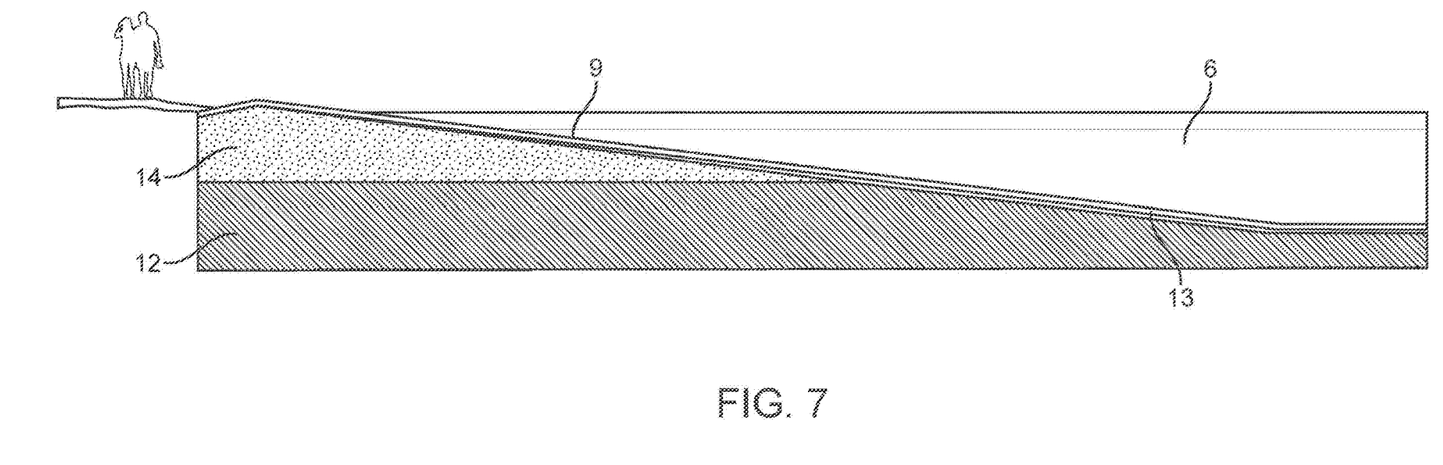
FIG. 7 shows a side view of an embodiment of a sloped access 9 to the basin of the swimming lagoon 6, wherein a support slab 14 is provided underneath a portion of the sloped access 15, and the non-permeable material 13 for containing the water in the large water body.

The method from the present invention, as seen in FIG. 3, allows to, in an innovative way, transform race tracks and zones within race tracks located in urban areas with good connectivity, which currently have very few uses, in order to provide beautiful tropical-style beach-like settings in front of a crystal clear lagoon that can help solving the need for more recreational urban open air spaces and tourism needs with a lower carbon footprint and therefore become a completely new and radical trend that can change the lifestyle of people around the world.

The present invention relates generally to a venue transformation and construction method for creating a controlled access tropical style swimming lagoon with crystal clear turquoise waters and beaches at the centerfield of racing and/or activity circuits, for swimming and the practice of water sports, wherein a portion of the infield of such racing and/or activity circuits is demolished in order to generate a swimming lagoon according to designs, construction parameters and configurations. There is at least an area of the tropical style swimming lagoon where public access is controlled, and a beach area is preferably located within the controlled access area.

As used herein, tropical-style refers to clear water lagoons with round shapes, that are suitable for direct contact recreational purposes, and that usually have turquoise colored crystal clear waters and do not have visible macro algae presence or a green water tonality like artificial lagoons and lakes located in parks and golf courses, among others.

The present invention aims to improve the aesthetics and provide new uses to race and/or activity circuits such as horse race tracks, speedways, athletic courses, in order to allow such facilities to be used over larger periods of time and/or periodically compared to current uses of once or twice per week.

One important and common feature all of these facilities have is the presence of a large infield that is located in the center location of the facility, being surrounded by the racing circuit. At the same time, current worldwide trends indicate that people are more and more looking for outdoor activities that can transport them into beautiful natural landscapes and scenery, where being in tropical sandy beaches and waterfront sceneries are one of the top experiences.

As such, the present invention discloses a venue transformation and construction method for creating a tropical style swimming lagoon with beaches in the centerfield of race or activity circuits which aims to repurpose the infield of such circuits by creating a recreational venue with at least one swimming lagoon and additional amenities. In a preferred embodiment of the invention, the recreational venue includes a number of recreational amenities, and may include a swimming area within the swimming lagoon with at least one beach located in its perimeter.

As used herein, race or activity circuits refer to any motor, animal, or athletic race tracks or circuits such as for auto, karts, motorcycles, trucks, horses, and dog racing as well as for track and field athletic events.

As used herein, infield site refers to the land comprised in the inner location of a race or activity circuit.

Typically, the infield site does not have tall construction installations or structures, as such sites should not significantly block the view of visitors attending the race or activity circuit installation. Therefore, an infield site must be provided in order to plan and coordinate the demolition process and the construction of the tropical style swimming lagoon. The infield site is located within the racing/activity circuit perimeter.

In more detail, the demolishing process comprises excavating at least a portion of the infield site to excavate a layer of between 15 cm to 6 meters in order to provide the necessary excavated volume for the swimming lagoon construction. To provide clarity, for the purposes of this application the term demolishing encompasses not only knocking down or tearing down current structures or installations, but also removing debris or non-fixed materials from such zone and digging or excavating a portion of the land as part of the construction method.

Optionally, if there are permanent or rigid structures within the infield site, demolition can be performed of such structures to allow excavation necessary to build the swimming lagoon.

The demolition process comprises excavation with machinery up to a depth of 20 centimeters over the final excavation level, where the final 20 cm may be excavated manually.

Once the design excavation level is achieved, the bottom soil must be compacted to achieve a 95% Modified Proctor Density. A 95% Modified Proctor Density means that the soil at the bottom is compacted to 95% of its maximum dry density. This aims to reduce post-construction settlements rates of such soil. As a reference, the Modified Proctor test uses a 4-inch-diameter mold which holds 1/30 cubic feet of soil, and uses a 10 lb. hammer falling through 18 inches, with 25 blows on each of five lifts, for a compaction effort of about 56,250 ft-lb/ft3. This can also be explained such that the bottom of the excavations are to be compacted to a 95% of the Maximum Dry Compacted Density, based on the Modified Proctor test (ASTM D1557-02) when the soil type has more than a 12% material passing under a No 200 mesh (opening of 0.075 mm). When the soil type has less than a 12% material passing under a No 200 mesh (opening of 0.075 mm), the soil must be compacted to achieve no less than 80% of its Relative Density.

The process also includes excavating a volume of at least 4,000 m3, preferably at least 7,000 m3 from an area within the infield site. This excavation material preferably will serve as the earthworks necessary to provide the basin of the swimming lagoon, wherein such earthworks are created within the property perimeter, and wherein the basin includes a basin perimeter and a bottom. It will be appreciated by those of skill in the art that the excavated material may prove to be unsuitable for the earthworks. For example the material may include a mixture of rocks, cement, tar or other detritus. In such an event, suitable fill and other materials may be brought to the site for the earthworks.

The basin for the lagoon is designed and constructed so that its surface area is at least 3,000 m2, preferably at least 5,000 m2, more preferably at least 10,000 m2, and most preferably at least 15,000 m2 and its deepest point has a minimum depth of 1.4 meters. As a reference, most infields of racetracks have between 2-20 hectares, with some of the large racetracks of the world having for example 16 hectares at their infield (For example, Meydan Racecourse in Dubai).

It's important to highlight that for the swimming lagoon of the present invention, since it has a surface larger than 3,000 m2, conventional swimming pool construction technologies are seldom economically and technically feasible, as for example swimming pool construction requires to have a large and thick concrete structure that comprises a series of inlets and outlets within the walls and bottom of the structure in order to be able to create water movement and circulation that allows to filter the complete water volume at least once per day. This is mainly to have a homogeneous water body so that when withdrawing and filtering the water flow means that the whole water volume is being filtered and there are no dead areas that have no water circulation and would therefore not be filtered efficiently.

For example, regulations for swimming pools around the world require the use of bottom and/or wall nozzles, wherein regulations preferably require the use of bottom inlets to be able to generate proper mixing and circulation of water before it is withdrawn from the pool to send to the filtration system. For example, Florida's swimming pool construction regulations require that inlets be installed so that spacing between floor inlets does not exceed 20 ft. (6 m) and the distance between a bottom inlet and a wall does not exceed 10 ft. (3 m). This means that a 25 m×50 m Olympic pool for example would require more than 35 bottom inlets, and a 3,000 m2 (60 m×60 m) swimming pool would require more than 70 bottom inlets, in addition to wall inlets that would further allow mixing the water volume so that when withdrawing water from the main drains, skimmers, or other withdrawal points and sending such water to the filtration system, it effectively allows to filter the complete water volume of the pool from 1 to 6 times per day (generally 4 times per day based on regulations). The present invention preferably requires that the swimming lagoon has at least 50% less inlets than those required for the filtration system of a conventional swimming pool according to swimming pool standards. As a comparison, for a lagoon of 15,000 m2 of surface (150×100), the number of bottom inlets would be more than 350.

Containment walls are preferably constructed on at least one section of the basin perimeter, as to form a waterfront perimeter that is arranged and configured to contain the water within the basin. Such containment walls require a backfill material in order to provide structural integrity to such walls.

In addition, a sloped area is preferably constructed in at least one section of the basin perimeter in order to create a beach access perimeter. The sloped area is constructed such that the slope of the beach access perimeter is between 5% and 30%. The sloped area may require construction or placement of a support slab in order to provide structural stability on such location. As an example, a support slab can be built out of reinforced concrete, shotcrete, plastics, or other support materials. For example, the sloped area may have high foot traffic of users accessing the swimming lagoon.

The shape of the waterfront perimeter is preferably curved to create a more natural aspect of the swimming lagoon with a tropical style. Additionally, the basin has a maximum width of 300 meters at its widest point. The width of the lagoon is defined as the measurement or extent of the lagoon from side to side; the lesser of the two dimensions of the lagoon measurements. The length of the lagoon is defined as the largest dimensional measurement of the lagoon.

The maximum width of the lagoon is limited in up to 300 meters, as there is little visual impact to be gained at eye level with larger distances.

The bottom of the basin is covered with a non-permeable material, in order to act as a water containment structure. The non-permeable bottom material that covers the bottom of the basin comprises plastic liners, shotcrete, or flexible materials that do not require the use of a thick concrete layer like conventional swimming pools. The use of vast surfaces of thick concrete is problematic, as in addition of having high costs, it can generate structural tensions that cause fractures, cracks, settlements in the concrete and may impact the structural properties of the basin.

In a preferred embodiment, the non-permeable material comprises a plastic liner of at least 1 mm of thickness, among other solutions. The plastic liner can have different colors and tonalities, but preferably it has a white, blue or light color which provides an intense turquoise tonality of the water body.

The swimming lagoon is built in order to provide a new and innovative amenity that allows generating a completely new user experience in race or activity circuit sites. Embodiments herein are directed to a swimming lagoon that is arranged and configured to optimize visitor experience. Specifically, the lagoon is arranged and configured in a way such that the relationship between all elements and purposes of the different areas of the lagoon enable guests and visitors to enjoy the experience as well as interact with the different areas that may be designated for different purposes. A beach area included in the swimming lagoon is preferred. However, there may be instances when a sloped beach access with a swimming area is impractical or is otherwise not desired for the specific site.

Further, the swimming lagoon is also preferably constructed in a manner so that it can be used not only for swimming purposes, but also for the practice of several water sports, such as kayaking, stand-up-paddling, boating, water skiing, among others and also providing a spectacular view of a turquoise crystal clear lagoon from the spectator area of the race track.

Although the swimming lagoon is man-made, it preferably includes shapes that tend to imitate natural geometries, and comprises a slightly elongated shape to provide visitors with at least one vantage point to experience dramatic views of the lagoon and its surroundings.

Additionally, the tropical style swimming lagoon comprises different elements and areas for providing an optimized visitor experience, preferably including at least one controlled access area. This is achieved by constructing one or more barriers around the basin perimeter of the swimming lagoon, in order to cordon off an area of the swimming lagoon to establish a controlled access area with a restricted access swimming lagoon located within. In that case, the controlled access area includes at least one beach access perimeter within the basin perimeter, thereby providing a new recreational amenity and venue for visitors. The barriers comprise at least one access point to selectively allow users into the controlled access area. The remaining area about the basin perimeter can optionally be an open access area, meaning that is a non-ticketed area, that is freely accessed by users. However, the controlled access area preferably requires a ticket, voucher or other payment of an entry fee for accessing such area which can be included within other fees or payments for example access can be included in seasonal tickets, or by being member of an association or group, being included as part of lodging facilities, among others.

Controlled access areas may be created about the swimming lagoon for other purposes as well. However, in the case there are non-ticketed areas, it is important to include separate access points for both controlled access areas and non-ticketed access areas of the lagoon. This enables visitors to clearly participate in either one or both areas depending on their purpose for visiting the race/activity circuit facility and its infield site and lagoon, including natural articulations and man-made focal points along the edge to encourage walkability and foster visitors with a sense of discovery. The swimming lagoon can be illuminated through a lighting system, in order to allow nighttime uses and have spectacular views from the spectator areas. The lighting system comprises exterior lighting systems and/or underwater systems.

As previously mentioned, it is preferred that the lagoon include at least one controlled access area for visitors for at least one beach area, wherein the beach area comprises a sandy beach and sloped transition into the swimming lagoon. The controlled access area may be designed such that the total beach area to lagoon area ratio is 1:2. Further, the beach area is preferably placed and designed considering general summer sun orientation, optimizing visitor experience. In another embodiment of the invention, the controlled access area surrounds the entire lagoon surface, and may include additional amenities within the controlled access area, such as recreational facilities including cafes, bars, restaurants, and others.

In another embodiment of the invention the construction of an amphitheater in the surroundings of the lagoon and nearby the beach area(s) is also preferred. This creates an opportunity to hold events such as concerts and festivals, among others in a unique setting. Other activities include music on the beach, dining on the beach, and other events on the beach such as weddings and sports events, among many others. The surroundings of the beach may include cafes, bars, restaurants, beach centers, promenades, hotels, entertainment facilities, virtual and immersive experiences, and similar facilities and amenities.

In the case of having a non-ticketed area within the venue, the at least one non-ticketed access area comprises optimized waterfront perimeter surrounding the swimming lagoon that has an unobstructed view of the lagoon and is not directly in front of any beach areas or esplanades that could affect the aesthetics of the landscape. The non-ticketed access area comprises restaurants, cafes, stores, bars, and similar facilities in its surroundings.

A screen may also be provided in the vicinity of the swimming lagoon to broadcast content and house events and shows, and can be located in the same sector as the amphitheaters, to create a new event venue having the swimming lagoon as its backdrop. Such screen can be fixed or may be removable and not permanent as to avoid creating obstructions to the race circuit during races or events, and can otherwise used for other times when racing events or activities are not held. The screen may also be used for streaming live or recorded events or general media, and the stage zone can be used to broadcast or hold e-sport competitions, concerts, plays, shows, performances, among others.

In an embodiment of the invention, the installations surrounding the tropical-style lagoon is artificially set with a beach theme, including the use of blue and white colors with the inspiration of the beach and beach kiosks and lighthouses.

It is important to highlight that some features such as screens, amphitheaters, kiosks, or other facilities built or installed in the surroundings of the tropical style lagoon should not interfere significantly with the view of spectators. The swimming lagoon can also be surrounded by vegetation such as plants and trees.

The method of the present invention also includes a connection path in order to allow transit of vehicles and people from one side to the other without obstructing the racing and/or activity circuit. Such connection path can include constructing a tunnel structure that connects the outfield of the racing and/or activity circuit with the infield site, or a bridge structure, the racing circuit can be designed to accommodate the passing of people and vehicles from one side of the racing track to the other during non-race times, or any other form that allows the passing of people and/or vehicles.

Accordingly, other components that embody the principles of this invention can be configured within the spirit and intent of this invention. The arrangement described herein is provided as only one example of an embodiment that incorporates and practices the principles of this invention. Other modifications and alterations are well within the knowledge of those skilled in the art and are to be included within the broad scope of the appended claims.

What is claimed is:

1. A venue transformation and construction method for creating a tropical style swimming lagoon with crystal clear waters and no visible macroalgae presence, where the lagoon comprises a sloped access, at an infield site of a racing or activity circuit facility, the infield site being contained within the racing or activity circuit perimeter, the method comprising:
   a) demolishing at least part of the infield site, wherein the demolition process includes excavating a layer of at least 15 cm and up to 6 meters;
   b) excavating material having a volume of at least 4,000 m3; wherein
      when the soil type has more than a 12% material passing under a No 200 mesh (opening of 0.075 mm), the bottom soil must be compacted to achieve a 95% Modified Proctor Density, also referred to as the Maximum Dry Compacted Density; and
      when the soil type has less than a 12% material passing under a No 200 mesh (opening of 0.075 mm), the soil must be compacted to achieve no less than 80% of its Relative Density;
   c) forming a basin for a large water body having a surface area of at least 3,000 m2 and a minimum depth of at least 1.4 meters at its deepest point, wherein earthworks for the basin are created within the infield surrounding perimeter, and wherein the basin includes a basin perimeter and a bottom, whereby the tropical-style swimming lagoon is created and has crystal clear waters suitable for direct contact recreational purposes such as swimming and the practice of water sports;
   d) constructing water containment walls on at least one section of the basin perimeter to form a waterfront perimeter, wherein the shape of the waterfront perimeter includes curves, whereby a more natural aspect for the tropical style swimming lagoon with crystal clear waters is created, and the basin has a maximum width of 300 meters;
   e) constructing a sloped access area on at least one section of the basin perimeter to form a beach access into the tropical-style lagoon with crystal clear waters and placing sand in the beach access, wherein the sloped access area is constructed with a support slab to provide structural stability to such area;
   f) constructing one or more barriers around the basin perimeter to cordon off an area to establish a controlled access area, wherein the controlled access area includes a beach access perimeter;
   g) including at least one access point within the one or more barriers to selectively allow users into the controlled access area;
   h) constructing at least one additional recreational facility comprising food and beverage and commercial facilities selected from the group comprising restaurants, bars, kiosks, stores, and cafes in the vicinity of the waterfront perimeter; and
   i) providing a connection path that connects the outfield of the racing or activity circuit with the infield site, in order to allow transit of vehicles and people from the outfield to the infield, wherein the connection path comprises at least one of a tunnel structure or a bridge structure, wherein vehicles and/or people can transit from one side to the other without obstructing the racing and activity circuit.

2. The construction method of claim 1, wherein the area about the basin perimeter not located within the controlled access area forms a non-ticketed access area which may be freely accessed by users.

3. The construction method of claim 1, further comprising building restaurants, kiosks, stores, cafes, and bars in the vicinity of the waterfront perimeter.

4. The construction method of claim 1, wherein step c) comprises forming a basin for a large water body having a surface area of at least 5,000 m2.

5. The construction method of claim 1, wherein the racing or activity circuit includes a track and the connection path further includes the track, where the track is adapted to allow people and vehicles to pass from one side to the other during non-race times.

6. The construction method of claim 1, the beach access having a sloped transition into the basin of between 5% and 30%.

7. The construction method of claim 1, whereby the lagoon is used for swimming, for the practice of water sports, and for housing shows and events.

8. The construction method of claim 1, wherein the non-permeable bottom material that covers the bottom of the basin comprises plastic liners, shotcrete, or flexible materials that do not require the use of a thick concrete layer like conventional swimming pools.

9. The construction method of claim 1, wherein the swimming lagoon is man-made, and has shapes that tends to imitate natural geometries.

10. The construction method of claim 1, wherein separate access points are included, for both controlled access areas and non-ticketed access areas, whereby visitors can participate in either one or both areas depending on their purpose for visiting the racing or activity circuit facility and the swimming lagoon.

11. The construction method of claim 1, wherein the controlled access area is designed so that the total beach area to swimming lagoon area ratio is 1:2.

12. The construction method of claim 1, wherein the surroundings of the swimming lagoon include the use of amphitheaters to hold events selected from the group comprising concerts and festivals.

13. The construction method of claim 1, wherein a non-fixed screen is provided in the vicinity of the swimming lagoon to broadcast content and house events and shows.

14. The construction method of claim 1, wherein the surroundings of the swimming lagoon include cafes, bars, restaurants, beach centers, promenades, hotels, entertainment facilities, and virtual and immersive experiences.

15. The construction method of claim 1, wherein the swimming lagoon is illuminated through a lighting system.

16. The construction method of claim 1, wherein the installations surrounding the tropical-style lagoon is artificially set with a beach theme, including the use of blue and white colors.

17. The construction method of claim 1, wherein the swimming lagoon is surrounded by vegetation including plants and trees.

18. A venue transformation and construction method for creating a tropical style swimming lagoon with crystal clear waters and no visible macroalgae presence, where the lagoon comprises a sloped access, at an infield site of a racing or activity circuit facility, the infield site being contained within the racing or activity circuit perimeter, the method comprising:
   a) demolishing at least part of the infield site, wherein the demolition process includes excavating a layer of at least 15 cm and up to 6 meters, the excavated material having a volume of at least 4,000 m3;
   b) forming a basin for a large water body having a surface area of at least 3,000 m2 and a minimum depth of at least 1.4 meters at its deepest point, wherein earthworks for the basin are created within the infield surrounding perimeter, and wherein the basin includes a basin perimeter and a bottom, whereby the tropical-style swimming lagoon is created and has crystal clear waters suitable for direct contact recreational purposes such as swimming and the practice of water sports;
   c) constructing water containment walls on at least one section of the basin perimeter to form a waterfront perimeter, wherein the shape of the waterfront perimeter includes curves, whereby a more natural aspect for the tropical style swimming lagoon with crystal clear waters is created, and the basin has a maximum width of 300 meters;
   d) constructing a sloped access area on at least one section of the basin perimeter to form a beach access into the tropical-style lagoon with crystal clear waters and placing sand in the beach access, wherein the sloped access area is constructed with a support slab to provide structural stability to such area;
   e) constructing one or more barriers around the basin perimeter to cordon off an area to establish a controlled access area, wherein the controlled access area includes a beach access perimeter;
   f) including at least one access point within the one or more barriers to selectively allow users into the controlled access area;
   g) constructing at least one additional recreational facility comprising food and beverage and commercial facilities selected from the group comprising restaurants, bars, kiosks, stores, and cafes in the vicinity of the waterfront perimeter; and
   h) providing a connection path that connects the outfield of the racing or activity circuit with the infield site, in order to allow transit of vehicles and people from the outfield to the infield, wherein the connection path comprises at least one of a tunnel structure or a bridge structure, wherein vehicles and/or people can transit from one side to the other without obstructing the racing and activity circuit;
   wherein the demolition process comprises excavating with machinery up to a depth of 20 centimeters above the final design excavation level, and wherein the remaining 20 cm are excavated manually.

* * * * *